(12) United States Patent
Donald

(10) Patent No.: US 6,208,778 B1
(45) Date of Patent: Mar. 27, 2001

(54) NON-PERPENDICULAR OPTICAL PATHS FOR A CROSSTALK-INHIBITING SWITCHING ARRANGEMENT

(75) Inventor: David K. Donald, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/197,015

(22) Filed: Nov. 20, 1998

(51) Int. Cl.[7] .............................. G02B 6/26; G02B 6/42
(52) U.S. Cl. .............................. 385/17; 385/17; 385/18; 385/19
(58) Field of Search ........................ 385/16–18, 4, 385/15–19

(56) References Cited

U.S. PATENT DOCUMENTS

| 4,121,884 | 10/1978 | Greenwood | 350/96.15 |
| 4,505,539 | 3/1985 | Auracher et al. | 350/96.15 |
| 4,988,157 | 1/1991 | Jackel et al. | 350/96.13 |
| 5,699,462 | 12/1997 | Fouquet et al. | 385/18 |
| 5,732,168 | * 3/1998 | Donald | 385/16 |

* cited by examiner

*Primary Examiner*—Frank G. Font
*Assistant Examiner*—Phil Natividad

(57) ABSTRACT

The crosstalk-inhibiting arrangement is used on a switching cell in which an optical signal from an input waveguide is alternatingly directed to first and second output waveguides, depending upon whether there is fluid in a region between the input waveguide and the first output waveguide. The fluid has a refractive index selected to promote propagation of light energy through the fluid. However, in the absence of fluid, the light is reflected toward a second switching mechanism via an intermediate waveguide. The intermediate waveguide is at an angle greater than 90° relative to the input waveguide. The second switching mechanism is also fluid-manipulable and is used to inhibit leakage reflection from passing to the second output waveguide. Preferably, the angle between the intermediate waveguide and the input waveguide is in the range of 95° to 150°.

18 Claims, 5 Drawing Sheets

NON-PERPENDICULAR OPTICAL PATHS FOR A CROSSTALK-INHIBITING SWITCHING ARRANGEMENT

TECHNICAL FIELD

The invention relates generally to optical switching arrangements and more particularly to switching arrangements for inhibiting crosstalk among optical waveguides.

BACKGROUND ART

While signals within telecommunications and data communications networks have been traditionally exchanged by transmitting electrical signals via electrically conductive lines, an alternative medium of data exchange is the transmission of optical signals through optical fibers. Information is exchanged in the form of modulations of laser-produced light. The equipment for efficiently generating and transmitting the optical signals has been designed and implemented, but the design of optical switches for use in telecommunications and data communications networks is problematic. As a result, switching requirements within a network that transmits optical signals is often satisfied by converting the optical signals to electrical signals at the inputs of a switching network, then reconverting the electrical signals to optical signals at the outputs of the switching network.

Recently, reliable optical switching systems have been developed. U.S. Pat. No. 5,699,462 to Fouquet et al., which is assigned to the assignee of the present invention, describes a switching matrix that may be used for routing optical signals from one of a number of parallel input optical fibers to any one of a number of parallel output optical fibers. Another such matrix of switching elements is described in U.S. Pat. No. 4,988,157 to Jackel et al. An isolated switching element 10 is shown in FIG. 1, while a 4×4 matrix 32 of switching elements is shown in FIG. 2. The optical switch of FIG. 1 is formed on a substrate. The substrate may be a silicon substrate, but other materials may be used. The optical switch 10 includes planar waveguides defined by a lower cladding layer 14, a core 16, and an upper cladding layer, not shown. The core is primarily silicon dioxide, but with other materials that achieve a desired index of refraction for the core. The cladding layers should be formed of a material having a refractive index that is substantially different from the refractive index of the core material, so that optical signals are guided along the waveguides.

The material core 16 is patterned to form an input waveguide 20 and an output waveguide 26 of a first optical path and to define a second input waveguide 24 and a second output waveguide 22 of a second optical path. The upper cladding layer is then deposited over the patterned core material. A gap 28 is formed by etching a trench through the core material and the two cladding layers to the substrate. The waveguides intersect the trench at an angle of incidence greater than the critical angle of total internal reflection (TIR) when the location 30 aligned with the waveguides is filled with a vapor or gas. Thus, TIR diverts light from the input waveguide 20 to the output waveguide 22, unless an index-matching fluid resides within the location 30 between the aligned waveguides 20 and 26. The trench 28 is positioned with respect to the four waveguides such that one sidewall of the trench passes through or slightly offset from the intersection of the axes of the waveguides.

The above-identified patent to Fouquet et al. describes a number of alternative approaches to switching the switching element 10 between a transmissive state and a reflective state. The element includes at least one heater that can be used to manipulate fluid within the gap 28. One approach is illustrated in FIG. 1. The switching element 10 includes two microheaters 50 and 52 that control the position of a bubble within the fluid-containing gap. The fluid within the gap has a refractive index that is close to the refractive index of the core material 16 of the four waveguides 20–26. Fluid fill-holes 54 and 56 may be used to provide a steady supply of fluid, but this is not critical. In the operation of the switching element, one of the heaters 50 and 52 is brought to a temperature sufficiently high to form a gas bubble. Once formed, the bubble can be maintained in position with a reduced current to the heater. In FIG. 1, the bubble is positioned at the location 30 of the intersection of the four waveguides. Consequently, an input signal along the waveguide 20 will encounter a refractive index mismatch upon reaching the gap 28. This places the switching element in a reflecting state, causing the optical signal along the waveguide 20 to be redirected to the output waveguide 22. However, even in the reflecting state, the second input waveguide 24 is not in communication with the output waveguide 26.

If the heater 50 at location 30 is deactivated and the second heater 52 is activated, the bubble will be attracted to the off-axis heater 52. This allows index-matching fluid to fill the location 30 at the intersection of the waveguides 20–26. The switching element 10 is then in a transmitting state, since the input waveguide 20 is optically coupled to the collinear waveguide 26.

In the 4×4 matrix 32 of FIG. 2, any of the four input waveguides 34, 36, 38 and 40 may be optically coupled to any one of the four output waveguides 42, 44, 46 and 48. The switching matrix is sometimes referred to as a "non-blocking" matrix, since any free input fiber can be connected to any free output fiber regardless of which connections have already been made through the switching matrix. Each of the sixteen optical switches has a gap that causes TIR in the absence of a fluid at the location between collinear waveguides, but collinear waveguides of a particular waveguide path are optically coupled when the locations between the waveguides are filled with the fluid. Trenches that are in the transmissive state are represented by fine lines that extend at an angle through the intersections of the optical waveguides in the matrix. On the other hand, trenches of switching elements in a reflecting state are represented by broad lines through points of intersection.

In FIGS. 1 and 2, the input waveguide 20 is in optical communication with the output waveguide 22, as a result of TIR at the empty location 30 of the gap 28. Since all other cross points for allowing the input waveguide 34 to communicate with the output waveguide 44 are in a transmissive state, a signal that is generated at input waveguide 34 will be received at output waveguide 44. In like manner, the input waveguide 36 is optically coupled to the first output waveguide 42, the third input waveguide 38 is optically coupled to the fourth output waveguide 48, and the fourth input waveguide 40 is optically coupled to the third output waveguide 46.

One concern with optical switching elements 10 of this type is that in the transmissive state, there is a small but potentially objectionable amount of reflection. If the index of refraction of the fluid is different than that of the core material 16, reflections occur. A precise match between the indices of refraction is problematic, since there are other considerations in the selection of a fluid. For example, since the fluid is manipulated using thermal energy, the thermal properties of the liquid must be considered. The greater the mismatch between the index of refraction of the fluid and the index of refraction of the core material 16, the greater the intensity of leakage to the second output waveguide 22 when the switching element is in the transmissive state for optically coupling the collinear waveguides 20 and 26. This leakage will cause crosstalk among the waveguides.

What is needed is a switching arrangement that achieves greater isolation among waveguides of an optical switch. Particularly, what is needed is a switching arrangement that inhibits crosstalk among waveguides.

SUMMARY OF THE INVENTION

A crosstalk-inhibiting arrangement for a switching cell includes using more than one fluid-manipulable switching mechanism within the cell. An input waveguide is in communication with a first output waveguide when fluid is aligned within a gap between the waveguides. On the other hand, when no fluid is aligned with the input waveguide, an optical signal along the waveguide is reflected at the first switching mechanism to an intermediate waveguide that connects the first switching mechanism to a second fluid-manipulable switching mechanism. By locating fluid of the second switching mechanism into alignment with the intermediate waveguide, an optical signal within the intermediate waveguide will propagate through the fluid to a second output waveguide. The two switching mechanisms are operated in a push-pull manner, so that when one is in a transmissive state, the other is in a reflecting state.

The intermediate waveguide has an angle that is non-perpendicular with respect to the input waveguide. Preferably, the angle of the intermediate waveguide relative to the input waveguide is in the range of 95° to 150°. More preferably, the angle is in the range of 96° to 135°. However, there may be applications in which an angle of less than 90° provides acceptable results.

The input waveguide and the first output waveguide have ends at opposite sides of the first switching mechanism. Since an optical signal from the input waveguide will undergo refraction as it enters and exits a fluid for which the refractive indices are closely but not precisely matched, optimal performance does not require that the two waveguides be collinear. In addition to inducing refraction, a non-precise matching of refractive indices between the waveguide material and the fluid causes some reflection to occur at the interface of the input waveguide with the fluid. The reflected energy is leakage that becomes crosstalk if the energy enters the second output waveguide. However, by operating the two switching mechanisms in the push-pull manner, the leakage is reflected at the second switching mechanism, thereby preventing crosstalk into the second output waveguide.

When the first switching mechanism is changed from the transmissive state to the reflecting state, the switching mechanism is changed from the reflecting state to the transmissive state. The switching mechanisms are total internal reflection (TIR) devices. An optical signal along the input waveguide is reflected at the first switching mechanism. The reflected signal enters the intermediate waveguide and propagates through the fluid within the second switching mechanism to the second output waveguide. The optimal alignment of the second output waveguide to the intermediate waveguide is dependent upon the amount of refraction that occurs as a result of any mismatch between the refractive indices of the waveguides and the fluid.

Preferably, there is a monitoring waveguide that intersects the second switching mechanism on a same side as the intermediate waveguide and at an angle to receive any light energy reflected at the second switching mechanism. The intensity of the reflected energy can be used for detecting the most likely forms of failure with respect to placing the two switching mechanisms in the desired states for directing an input optical signal to either the first or the second output waveguide.

Also in the preferred embodiment, there is a second input waveguide that is coupled to the second output waveguide when the second switching mechanism is in the reflecting state. Thus, the cell can be only one cell within a switching matrix of the type described above with reference to FIG. 2.

An advantage of the invention is that by using two TIR switching mechanisms within a single cell, crosstalk among waveguides is effectively controlled. Moreover, the use of the monitoring waveguide allows the crosstalk-inhibiting arrangement to be self-diagnosing.

DETAILED DESCRIPTION

Figure 3:
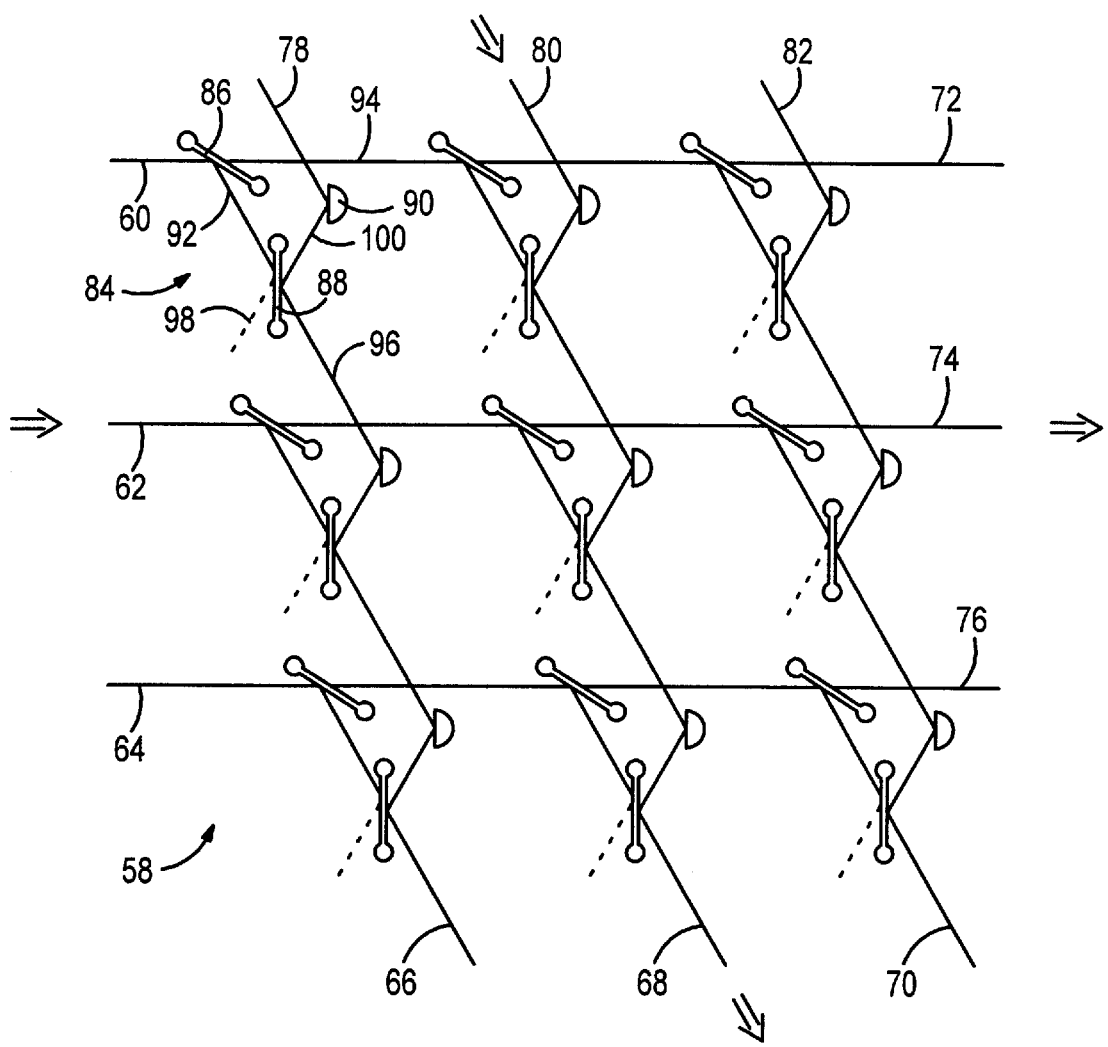
FIG. 3 is a schematic view of a 3×3 matrix of switching cells having a crosstalk-inhibiting arrangement in accordance with the invention.

With reference to FIG. 3, a matrix 58 of optical switches employs bistable cells for selectively coupling any one of three input waveguides 60, 62 and 64 to any one of three output waveguides 66, 68 and 70. Optionally, additional columns of switching cells may be connected along waveguides 72, 74 and 76 and additional rows of switching cells may be connected via waveguides 78, 80 and 82.

Figure 1:
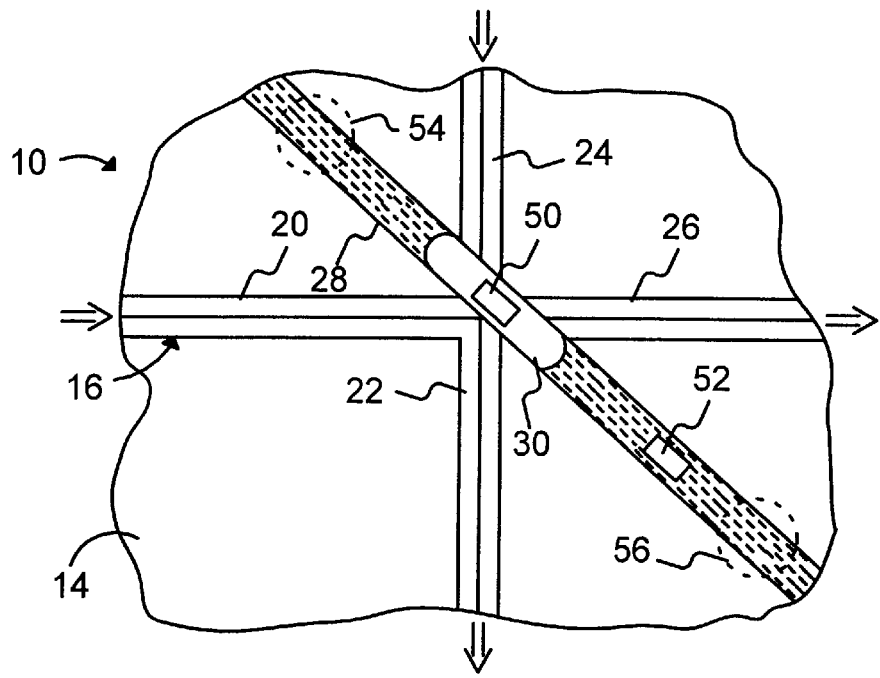
FIG. 1 is a top view of an optical switching element that utilizes total internal reflection in accordance with the prior art.
Figure 2:
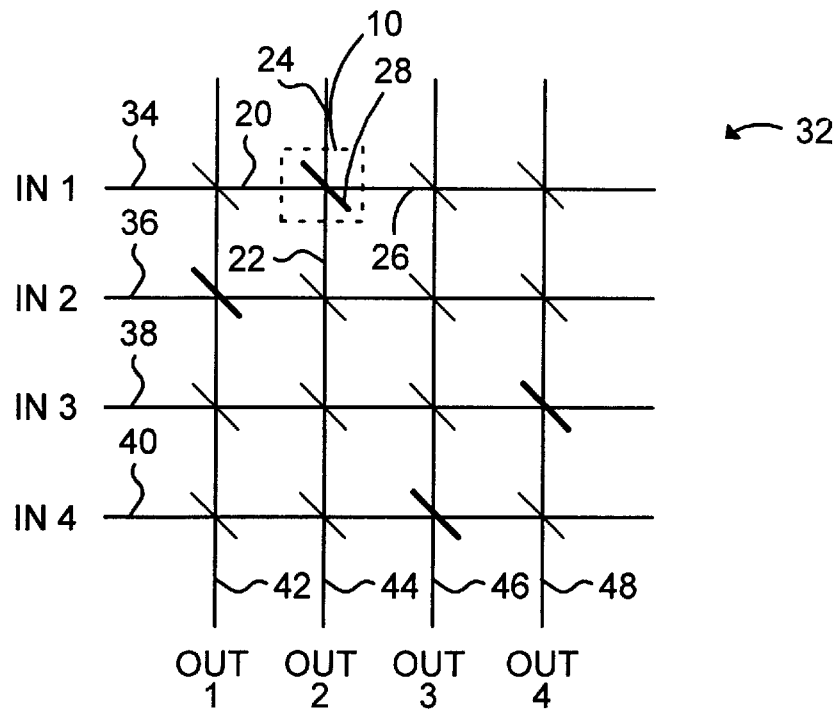
FIG. 2 is a 4×4 matrix of switching elements of FIG. 1 to allow connection of any one of four input waveguides to any one of four output waveguides in accordance with the prior art.
Figure 4:
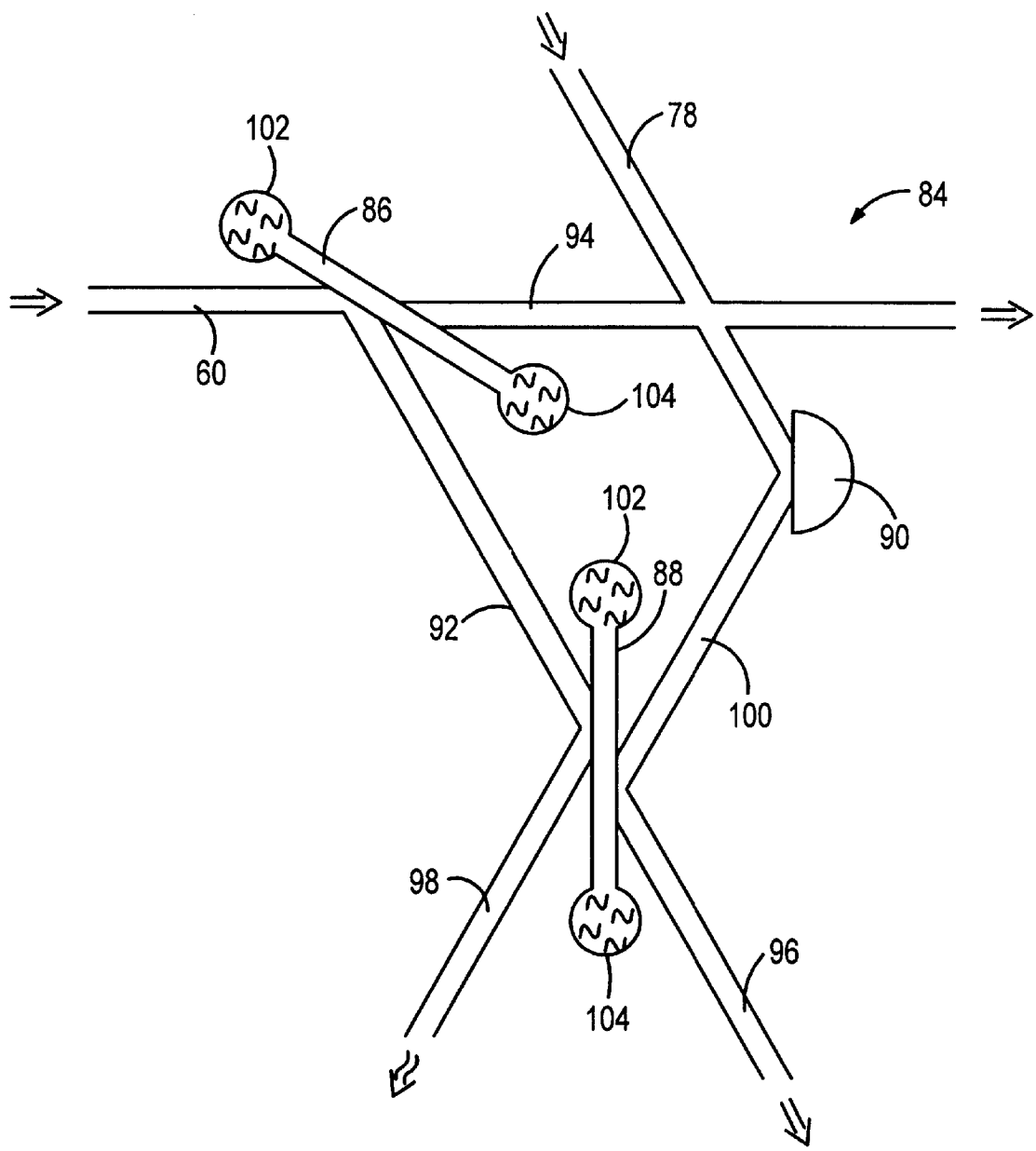
FIG. 4 is a schematic view of one of the switching cells of FIG. 3.

Each one of the optical switches in the matrix 58 of nine switches utilizes a push-pull operation to direct optical signals with little or no crosstalk among waveguides. Referring to FIGS. 3 and 4, each optical switch 84 includes three total internal reflection (TIR) elements. Two of the TIR elements are trenches 86 and 88 that form gaps at intersections of waveguides, while the third element is a fixed state TIR mirror 90. As described above with reference to FIG. 1, a thermal optical switch may be formed by etching a trench 86 and 88 at a crosspoint of optical waveguides. One or more heaters may be used to create bubbles at a crosspoint. When a bubble within the trench 86 is aligned with the input waveguide 60, the first switching mechanism within the optical switch 84 will be in a reflecting state, causing an optical signal from the input waveguide to reflect to an intermediate waveguide 92. On the other hand, if a suitable fluid resides in alignment with the input waveguide 60, the first switching mechanism is in a transmissive state, causing the optical signal to propagate through the fluid to a waveguide 94. In a similar manner, fluid aligned with the intermediate waveguide 92 within the trench 88 will cause optical communication between the intermediate waveguide and a waveguide 96, while a bubble aligned with the intermediate waveguide will cause any light from the intermediate waveguide to be reflected into a monitoring waveguide 98.

The input waveguide 60 intersects the trench 86 at an angle of incidence in the range of 45° to 60°, but this is not critical. More importantly, the intermediate waveguide 92 is at an angle greater than 90° and less than 150° relative to the input waveguide 60. A more preferred range is 96° to 135°. The angle of the monitoring waveguide 98 to the intermediate waveguide 92 is preferably the same as the angle between the input waveguide 60 and the intermediate waveguide 92, since the design and fabrication of the matrix is simplified by aligning the waveguides in parallel, when possible. Thus, the angle of a waveguide 100 to the output waveguide 96 and to the waveguide 78 is preferably the same as the angle of the input waveguide 60 to the intermediate waveguide 92.

Opposite ends of each of the trenches 86 and 88 are connected to fluid fill-holes 102 and 104. The fluid fill-holes connect to a liquid reservoir, allowing liquid to be replenished as needed. Many alternative liquids may be used, with each having associated advantages and disadvantages. Water and light alcohols do not have indices of refraction that match the index of the waveguides as closely as other liquids, but they do not decompose as quickly. There is also a concern that water and light alcohols may be susceptible to the buildup of bacteria or viruses within the liquid supply. A disinfectant may be added to the supply to retard the formation of bacterial or viral contamination, but the refractive index effect of any disinfectant must be considered in the design of a switch that is to include the disinfectant.

As shown in FIG. 4, the waveguide 94 is offset from collinearity with the input waveguide 60. The offset is designed to compensate for the mismatch in the refractive indices of the waveguide material and fluid that is within the trench 86. When fluid is aligned with the input waveguide 60, an optical signal will propagate through the trench 86, but some refraction will occur. The degree of offset of the waveguide 94 is selected based upon the amount of refraction as a result of the mismatch in refractive indices. Similarly, the waveguide 96 is offset from the intermediate waveguide 92 by a distance that is selected to compensate for refraction incurred as an optical signal propagates through fluid within the trench 88.

The optical switch 84 includes a first switching mechanism that is toggled by manipulating fluid within the trench 86 and includes a second switching mechanism that is toggled by manipulating fluid within the trench 88. A concern with the operation of the first switching mechanism is that when fluid is aligned between the input waveguide 60 and the waveguide 94, a small but potentially objectionable amount of reflection occurs at the interface of the input waveguide with the trench. The reflection occurs even if the refractive index of the fluid is closely matched to the refractive index of the waveguide material. The greater the difference in refractive indices, the greater the intensity of reflected light, even though the first switching mechanism is in the transmissive state. The addition of the second switching mechanism removes the potentially objectionable leakage reflection from reaching the waveguide 96. This is accomplished by operating the two switching mechanisms in the push-pull arrangement, such that the two switching mechanisms are always in opposite states. Another concern is the reliability of the optical switch 84. The addition of the monitoring waveguide 98 allows the push-pull operation to be monitored in real time. If a fault is detected, repeated activation pulses can be applied to replace and/or remove liquid as required to correct the fault.

When the first switching mechanism is in the transmissive state, an input optical signal along the input waveguide 60 propagates to the waveguide 94 with only a limited amount of leakage reflection into the intermediate waveguide 92. The leakage light will reach the second trench 88, which is in the reflecting state. The switching mechanism is a TIR element, so the leakage light is reflected to the monitoring waveguide 98. Therefore, no light exits the waveguide 96 that leads to the next cell of the switching matrix 58 of FIG. 3. Instead, the leakage light along the monitoring waveguide 98 may be input to a monitor circuit, not shown. The monitor circuit may detect the most likely forms of failure of the optical switch 84. If the two switching mechanisms are operating properly, the intensity of light along the monitoring waveguide 98 will be weak when the first switching mechanism is in a transmissive state. The intensity will be primarily dependent upon the index difference between the waveguide material and the fluid. In a fault condition in which both of the switching mechanisms of the switch 84 are in a transmissive state, the intensity of the light along the monitoring waveguide 98 will be below the anticipated intensity, thereby demonstrating one type of failure. On the other hand, if the switching mechanisms are both in a reflecting state, effectively all of any input signal along the input waveguide 60 will be directed to the monitoring waveguide 98, thereby demonstrating the second type of failure.

Again referring to the condition in which the first switching mechanism is in the transmissive state and the second switching mechanism is in the reflecting state, the waveguide 94 is optically coupled to the input waveguide 60, but the waveguide 96 is decoupled from the input waveguide. In this condition, an optical signal can be transmitted from an "above" switch via the waveguide 78. The light traveling through the waveguide 78 will not interfere with light traveling through waveguide 94. Instead, the light from the above switch will strike the TIR mirror 90 and be reflected to the interface of the waveguide 100 with the trench 88. Since the trench 88 is in the reflecting state, the light will be reflected into the waveguide 96 for propagation to the optical switch "below" the switch 84.

In order to direct an input optical signal from the input waveguide 60 to the waveguide 96, the states of the two switching mechanisms are reversed. That is, the first switching mechanism is changed to a reflecting state by removing liquid from alignment between the input waveguide 60 and the waveguide 94, while the second switching mechanism is changed to the transmissive state by filling the gap between the waveguides 92 and 96 with liquid. The means for manipulating the liquid within the two trenches 86 and 88 is not critical to the invention. It is possible that the two trenches can be replaced with a single trench in which a single gas bubble is manipulated to achieve the push-pull operation of the switch 84.

With the first switching mechanism in the reflecting state, an optical signal along the input waveguide 60 is reflected by the trench 86 into the intermediate waveguide 92. Since the second switching mechanism is in the transmissive state, the optical signal propagates through the liquid within the second trench 88 and exits into the waveguide 96. Some reflection will occur at the interface of the intermediate waveguide with the trench 88. This leakage current enters the monitoring waveguide 98 and may be used to confirm that the two switching mechanisms of the optical switch 84 are in opposite states.

Referring to FIG. 3, the push-pull operation of the optical switch 84 determines whether an input optical signal along input waveguide 60 remains in the same row of switches in the matrix 58 or is directed "downwardly" to the next row for output via the output waveguide 66. The monitoring waveguide 98 is shown in dashed lines, since the error detection capability is not critical to the operation of the matrix.

Figure 5:
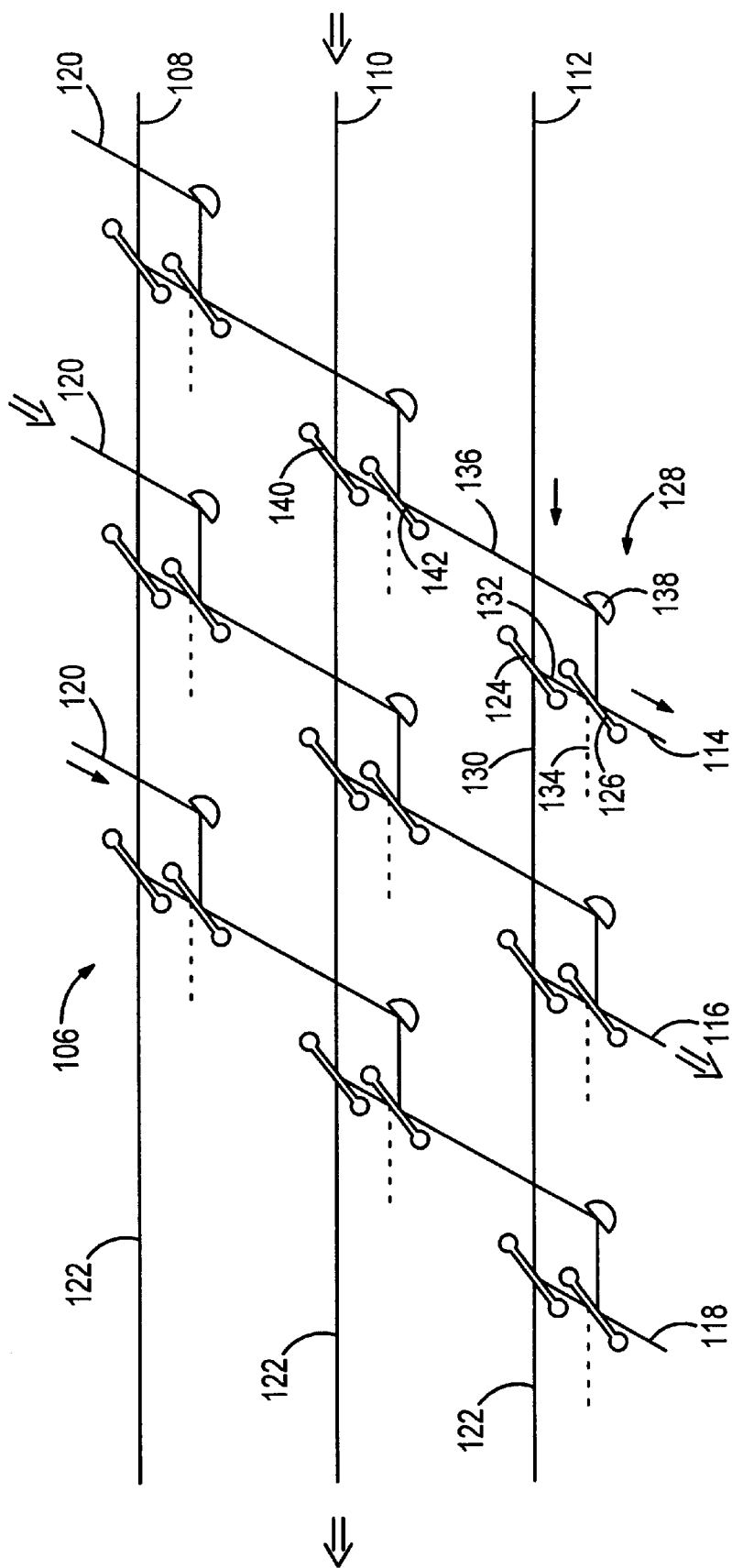
FIG. 5 is a schematic view of a second embodiment of a 3×3 matrix of switching cells having a crosstalk-inhibiting arrangement in accordance with the invention.
Figure 6:
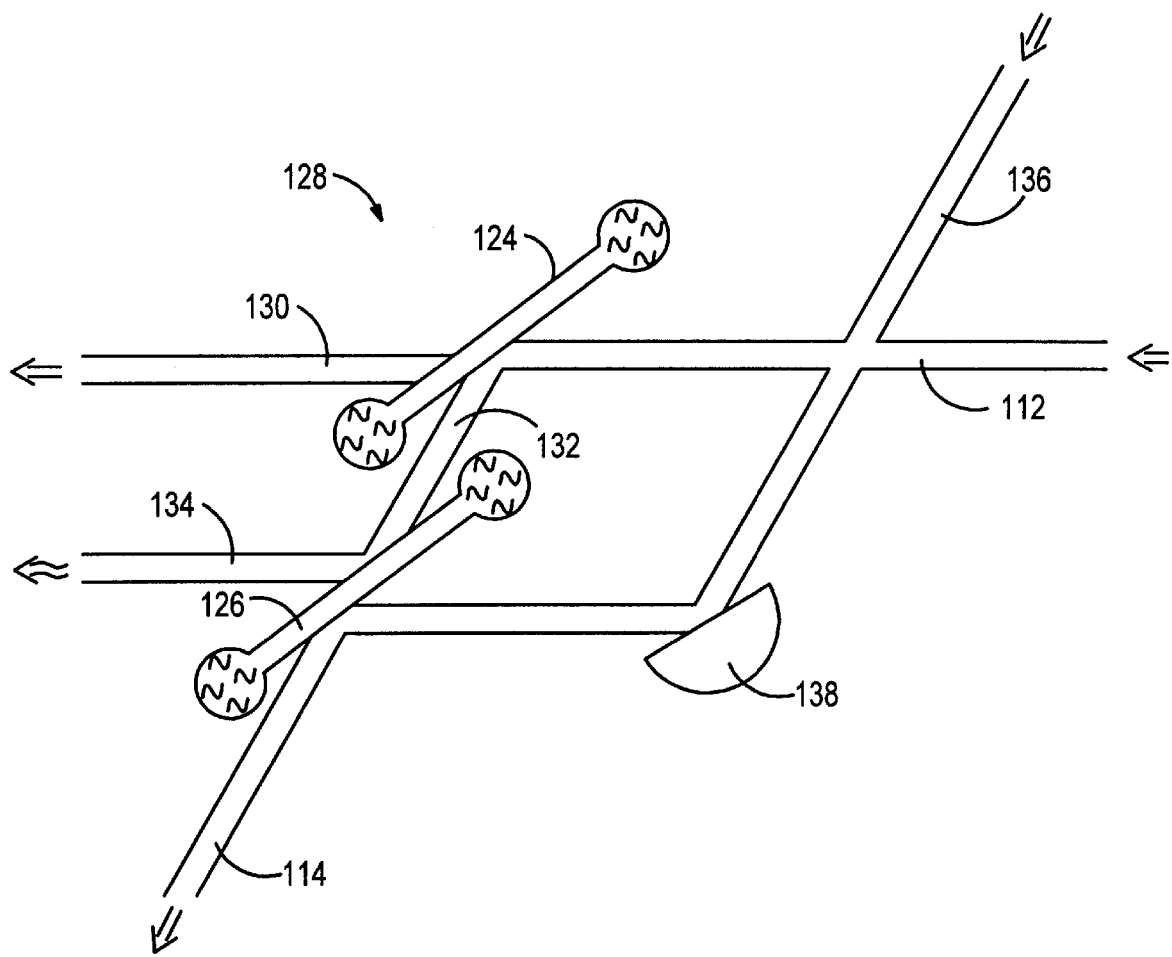
FIG. 6 is a schematic view of one of the switching cells of FIG. 5.

A second embodiment of a crosstalk-inhibiting arrangement for a switching cell will be described with reference to FIGS. 5 and 6. In FIG. 5, a 3×3 switching matrix 106 includes three input waveguides 108, 110 and 112 and includes three reflecting state output waveguides 114, 116 and 118. Waveguides 120 may be used to add additional rows of switches, and waveguides 122 are through guides and may be used to add additional columns.

First and second trenches 124 and 126 are formed to provide first and second switching mechanisms for push-pull operation of an optical switch 128. The input waveguide 112 is optically coupled to a waveguide 130 when the first switching mechanism is in a transmissive state, i.e., when liquid is aligned with the input waveguide to allow propagation to be generally aligned with waveguide 130. Any leakage reflection at the wall of the trench 124 is directed into an intermediate waveguide 132. The intermediate waveguide 132 is at an angle in the range of 95° to 150° relative to the input waveguide 112. A more preferred range is 96° to 135°, inclusive. When the first switching mechanism is in the transmissive state, the second switching mechanism is in the reflecting state. A gas bubble at the intersection of the intermediate waveguide with the second trench 126 causes any light propagating down the intermediate waveguide to be reflected into a monitoring waveguide 134. The monitoring waveguide may be used in the same capacity as described with reference to FIGS. 3 and 4. By placing a monitoring circuit at the output of the monitoring waveguide 134, the intensity of leakage reflection can be measured and used for confirming proper functioning of the push-pull operation. If both of the switching mechanisms are in a transmissive state, the intensity of light along the monitoring waveguide will be substantially less than the anticipated intensity. Corrective action can then be triggered by the monitoring circuit. On the other hand, if both of the switching mechanisms are in the reflecting state, the intensity along the monitoring waveguide 134 will be substantially greater than the anticipated intensity. Again, corrective action may be triggered by the monitoring circuit.

When the first switching mechanism is in the reflecting state, the second switching mechanism is changed to the transmissive state, providing optical communication between the input waveguide 112 and the output waveguide 114 via the intermediate waveguide 132 and the liquid within the second trench 126. The input signal is reflected at the wall of the first trench 124, but propagates through the liquid within the second trench 126.

Alternatively, the output waveguide 114 may be coupled to one of the other two input waveguides 108 and 110 by means of a waveguide 136 and a fixed TIR mirror 138. For example, if the input waveguide 110 is to be coupled to the output waveguide 114, bubbles are properly aligned to induce TIR at trenches 140 and 126, while fluid is aligned to allow light transmission through a trench 142. With this setup, an input signal from the input waveguide 110 is reflected at the trench 140, propagates through the trench 142, and is reflected at both the TIR mirror 138 and the trench 126.

The invention may be used in matrices other than those shown in FIGS. 3 and 5. In fact, the crosstalk-inhibiting arrangement may be used in applications having a single switching cell. Moreover, while the invention has been described and illustrated in the clearly preferred embodiment in which waveguides intersecting at a trench are an angle in the range of 95° to 150°, there may be applications in which an angle of less than 90° is desirable.

What is claimed is:

1. A crosstalk-inhibiting arrangement for a switching cell in which an optical signal from an input waveguide is alternately directed to first and second output waveguides depending upon a presence or absence of fluid in a first region between said input waveguide and said first output waveguide, said first region being a portion of a fluid-manipulable first switching mechanism, said arrangement comprising:

an intermediate waveguide and a fluid-manipulable second switching mechanism positioned to form an optical path from said input waveguide to said second output waveguide when said first region has an absence of said fluid, said intermediate waveguide extending from said first region at an angle in the range of 95 degrees to 150 degrees relative to said input waveguide, said second switching mechanism being positioned such that a second region is formed between said intermediate waveguide and said second output waveguide.

2. The arrangement of claim 1 further comprising a control means for manipulating fluid in said first and second switching mechanisms such that changing said first switching mechanism between a transmissive state and a reflecting state is accompanied by changing said second switching mechanism to an opposite one of said transmissive and reflecting states.

3. The arrangement of claim 2 wherein said control means includes heaters in thermal communication with said fluid in said first and second switching mechanisms.

4. The arrangement of claim 1 further comprising a second input waveguide intersecting said second switching mechanism such that said second output waveguide is coupled to said second input waveguide when said second region has an absence of fluid and is coupled to said intermediate waveguide when said second region includes said fluid.

5. The arrangement of claim 4 further comprising a mirror positioned to redirect light along said second input waveguide, said second input waveguide having a corner at said mirror, said corner defining an angle in the range of 95 degrees to 150 degrees.

6. The arrangement of claim 1 wherein said first and second switching mechanisms are thermally actuated devices for manipulating fluid within gaps that include said first and second regions.

7. The arrangement of claim 6 wherein said input and intermediate waveguides are defined by at least one patterned layer on a substrate, said gaps being trenches through said at least one patterned layer.

8. The arrangement of claim 1 wherein one of said input and first and second output waveguides is optically coupled to a different switching cell in a matrix of switching cells.

9. The arrangement of claim 1 further comprising a monitor waveguide intersecting said second region at an angle in the range of 95 degrees to 150 degrees relative to said intermediate waveguide for detecting combined states of said first and second switching mechanisms.

10. A push-pull switching arrangement for alternately directing an optical signal to first and second outputs comprising:

an input path having a firs t end coupled to receive said optical signal and having a second end that intersects a first gap;

a fluid displaceable within said first gap and a second gap, said fluid having a refractive index similar to a refractive index of said input path such that said optical signal propagates through said first gap when said fluid is in alignment with said input path;

a first output path intersecting said first gap in general alignment with said input path to receive said optical signal when said fluid is in alignment with said input path;

an intermediate path having a first end intersecting said first gap and having a second end intersecting said second gap, said intermediate path being aligned at an angle in the range of 95 degrees to 150 degrees with respect to said input path to receive said optical signal from said input path upon reflection at said first gap when said fluid is misaligned from said input path; and a second output path intersecting said second gap in general alignment with said intermediate path to receive said optical signal from said intermediate path when said fluid is misaligned from said input path and is aligned between said intermediate and second output paths.

11. The switching arrangement of claim 10 wherein each of said input, output and intermediate paths is a waveguide on a substrate and wherein said first and second gaps are separate trenches, each trench having a volume of said fluid and having at least one heater for manipulating said fluid.

12. The switching arrangement of claim 10 further comprising a monitor waveguide intersecting said second gap at an angle of greater than 90 degrees with respect to said intermediate path to receive light reflected at said second gap.

13. The switching arrangement of claim 12 further comprising a second input path intersecting said second gap at an angle of greater than 90 degrees relative to said second output path and being optically coupled to said second output path by reflection of light at said second gap.

14. A push-pull switching arrangement for alternately directing an optical signal to first and second outputs comprising:

an input waveguide intersecting a first gap having thermally displaceable fluid;

a first output waveguide intersecting said first gap on a side opposite to said input waveguide and aligned to be optically coupled to said input waveguide when said fluid is located between said input and output waveguides;

an intermediate waveguide intersecting said first gap on a side common with said input waveguide and at an angle of less than 90 degrees relative to said input waveguide for optically coupling with said input waveguide when said fluid is misaligned with said input waveguide;

a second output waveguide intersecting a second gap on a side opposite to and in general alignment with said intermediate waveguide such that said intermediate and second output waveguides are optically coupled when a second volume of said thermally displaceable fluid is located between said intermediate and second output waveguides; and a second input path that is operationally isolated from manipulation of said fluid relative to said first gap and that intersects said second gap on a side common with said second output waveguide such that said second input path and said second output waveguide are optically coupled when said second volume is misaligned with said second input path.

15. The switching arrangement of claim 14 further comprising a monitoring waveguide intersecting said second gap on a side common with said intermediate waveguide and at an angle of less than 90 degrees relative to said intermediate waveguide.

16. The switching arrangement of claim 14 further comprising heaters in thermal communication with said first and second gaps to thermally manipulate said fluid.

17. A crosstalk-inhibiting arrangement for a switching cell in which an optical signal from an input waveguide is alternately directed to first and second output waveguides depending upon a presence or absence of fluid in a first region between said input waveguide and said first output waveguide, said first region being a portion of a fluid-manipulable first switching mechanism, said arrangement comprising:

an intermediate waveguide and a fluid-manipulable second switching mechanism positioned to form an optical path from said input waveguide to said second output waveguide when said first region has an absence of said fluid, said intermediate waveguide extending from said first region at an angle greater than 90 degrees relative to said input waveguide, said second switching mechanism being positioned such that a second region is formed between said intermediate waveguide and said second output waveguide; and a second input path that is optically isolated from said first switching mechanism and that intersects said second switching mechanism such that said second output waveguide is coupled to said second input path when said second region has an absence of fluid and is coupled to said intermediate waveguide when said second region includes said fluid.

18. The arrangement of claim 17 wherein said angle of said intermediate waveguide relative to said input waveguide is in the range of 95 degrees to 150 degrees.

* * * * *